July 20, 1965
S. E. PETERSON
3,195,596
APPARATUS FOR PRODUCING SEED POTATO CUTTINGS
Filed Jan. 21, 1963
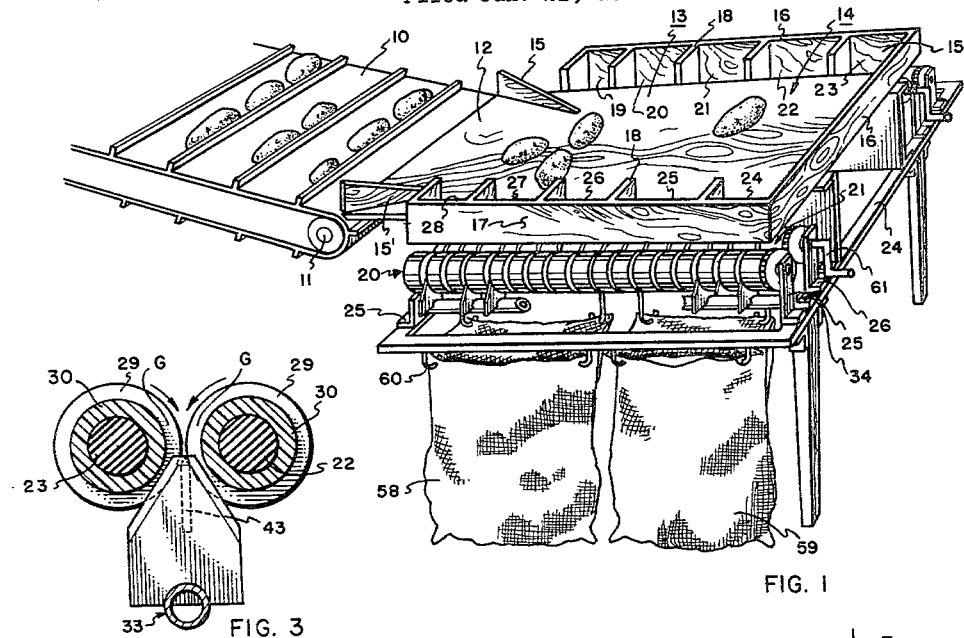
FIG. 1
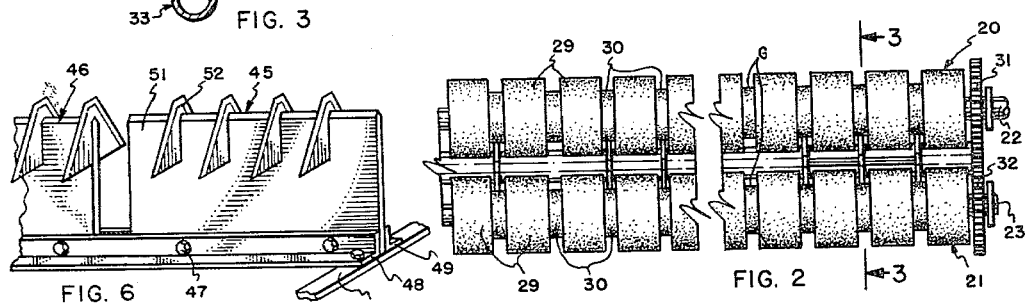
FIG. 3   FIG. 6   FIG. 2
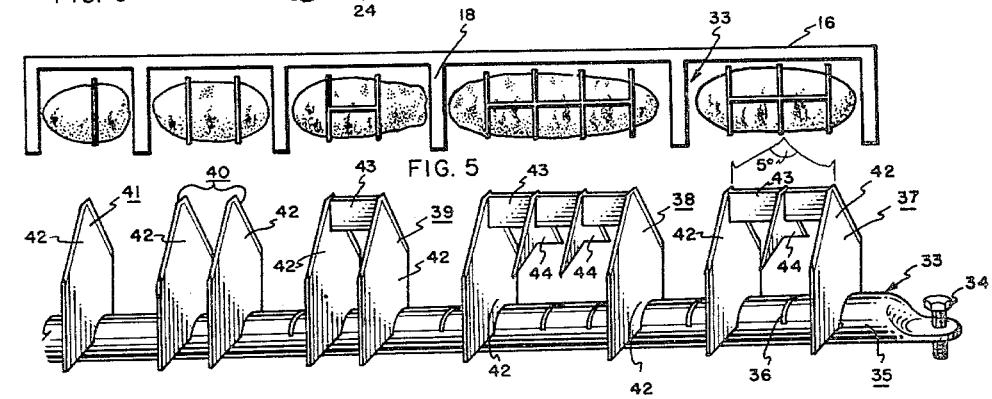
FIG. 5
FIG. 4
INVENTOR.
SOREN E. PETERSON
BY *M. Ralph Shaffer*
HIS ATTORNEY

United States Patent Office 3,195,596
Patented July 20, 1965

3,195,596
APPARATUS FOR PRODUCING SEED POTATO CUTTINGS
Soren Eskel Peterson, 2689 South 3rd East, Salt Lake City, Utah
Filed Jan. 21, 1963, Ser. No. 252,697
5 Claims. (Cl. 146—162)

The present invention relates to agricultural equipment and, more particularly, to the provision of apparatus for cutting potatoes fed to it for obtaining seed potato cuttings therefrom for planting.

The principal object of the present invention is to provide a new and improved machine, and novel components therefor, for producing seed potato cuttings.

The further object of the invention is to provide a potato seed cutting machine which employs resilient roller means for feeding pre-aligned potatoes through novel cutter bar means in such a manner as to effect a production of seed potato cuttings in an automatic manner.

A further object of the invention is to provide novel cutter bar means, of varying configurations as to cutters thereof, for accommodating various sized potatoes so that the same may be suitably cut to produce seed potato sections.

A further object of the invention is to provide a potato seed cutter wherein potatoes may be conveniently aligned and cut in discrete ways according to their size so as to produce an optimum number of seed cuttings in a form most satisfactory for insuring growth and maturing when planted.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIGURE 1 is a perspective view of the apparatus or machine of the present invention for producing potato seed cuttings, this in combination with suitable feeder means so that potatoes may be conveyed thereto preparatory to hand or other sorting for accomplishing the cutting hereinafter described.

FIGURE 2 is a plan of the feeder roller means employed to receive potatoes and to urge the same through the cutter bar means used.

FIGURE 3 is a section enlarged as to scale and taken along the line 3—3 in FIGURE 2, indicating the positioning of a respective cutter bar means relative to the feeder rollers.

FIGURE 4 is a perspective view of cutter bar illustrated in FIGURE 3, indicating the various cutters of varying configurations to accommodate various sizes and types of potatoes.

FIGURE 5 is a plan view of the cutter of FIGURE 4 and of the grading means of the sizing table used therewith so as to insure alignment of potatoes as to their size over the respective cutters of FIGURE 4.

FIGURE 6 is an enlarged, fragmentary perspective view of a second type of cutter bar which may be employed in the invention; the cutters herein shown include a central principal blade and one or more transverse secondary blade members affixed thereto.

The present invention renders the machine usable for hand sorting the potatoes to any one of the several compartments or openings hereinafter described to accomplish the cutting function. It will be understood that other types of sorting, other than hand-sorting, may be used to place the potatoes of various sizes properly as to the cutters intended to cut the same.

In FIGURE 1, a feeder conveyor belt 10 is routed about conventionally journaled idler roller 11 and is suitably designed to feed potatoes onto the admittance portion 12 of the table 13 of the sizing table 14. Admittance portion 12 may, if desired, be delineated by suitable upstanding guards 15¹ to keep the potatoes feeding into a central portion of table 13.

Circumferentially disposed about table 13 and forming a part of sizing table 14 are sides 15, 16 and 17, the latter two of which include partitions 18, delineating potato admittance openings, which extend toward and may even engage the table 13. The several partitions 18 on both sides of table 13, with their respective sides 16 and 17, define respective chutes or openings 19-28, of varying girths, and which are designed to receive and center or at least register the potatoes, once placed there by hand or by other means, over suitable cutter bar means hereinafter described.

Feeder rollers 20 and 21 each comprise shafts 22 and 23, suitably journaled to frame 24 at uprights 25 and 26 thereof, and also pluralities of large diameter rollers 29 and small diameter rollers 30. The rollers 29 and 30 are resilient, preferably sponge rubber, and serve to feed potatoes placed in the openings 19-28 into and through the cutter bar means which is disposed immediately underneath the feeder rollers. The purpose of the reduction in diameter as to rollers 30, relative to rollers 29, is to provide corresponding annular grooves G and hence accommodate the positioning of the forward part of the cutter bar immediately adjacent the feeder rollers so that these rollers may properly feed and pass the potatoes fed therein through the associated cutter bar means. V-belts and pulleys, chains and sprockets or, as shown, gears 31 and 32 intercouple the two shafts 22 and 23 together for mutual counter-revolvement.

One type of cutter bar member which may be employed in the present invention is designated as 33 and is illustrated in FIGURES 3, 4 and 5. The cutter bar is secured at its opposite extremities by bolt attachments 34 to frame 24 and, as shown, and includes a base tubular member 35 provided with a multiplicity of slots 36 which are irregularly spaced, as desired, and which receive cutters 37-41. The cutters 37-41 include primary blade members 42, cross blade members 43, and secondary blade members 44 as shown. Cross blade members 43 are connected to span between the primary blade members 42. Silver soldering is recommended for securement of the several blade members together in the configuration shown. Secondary blade members 44 and primary blade members 42 may or may not be slotted to receive the cross blade members 43, as desired.

FIGURE 5 indicates the manner in which the structure of FIGURE 4 operates to cut potatoes of various sizes. The larger the potatoes, the more cuttings should be made so that the cut pieces (having eyes) may be used for planting purposes. It is desirous that the ends of the potatoes be not cut along the central axis and, therefore, the several partitions 18 align or register the potatoes appropriately over the respective cutters so that the potato ends can remain uncut.

FIGURE 6 illustrates a second type of cutter bar wherein cutters 45 and 46 may be bolted by attachments 47 to and between angle irons 48 and 49, the same being secured to frame 24 as shown in fragmentary view in FIGURE 6. The cutters employed may be spaced apart appropriately and assume any desired configuration as, for example, primary blade members 51 and transverse blade members 52 which are secured thereto as by a silver soldering technique. The primary and secondary blade members 51 and 52 may be mutually slotted so as to fit together in desired transverse alignment prior to the application of silver solder. The cutters of FIGURE 6 may include any number of secondary blade members 52 so that the configurations of FIGURE 5 are obtained for the new construction.

In the cutter bar embodiment illustrated in FIGURES 3–5 it is desirous that the planes of the principal blade members are angled to intersect in front of the blade members at a nominal angle of say, 5 degrees so that there will be sufficient clearance and therefore no wedging of cut potato sections in the cutter. Thus, as to this regard, the distance between the base extremities of principal blade members 42 (in FIGURE 4) will be slightly greater than the distance between these blade members at their cutting edges adjacent the feeder rollers.

Once the potato cuttings are made, then the cut sections will fall into bags 58 and 59 which may be secured by hooks 60 to frame 24. Obviously, dollies or other conveyors and other structure may be used to collect and carry away the seed potato cuttings.

A crank 61 is shown connected to shaft 22 and the intercoupled gears 31 and 32 provide for a mutually countercurrent rotation of the feeder rollers so that the potatoes may be fed into and forced through the cutter bar means employed. Obviously one or both of the shafts 21 and 22 may be motor driven and otherwise coupled together as hereinbefore mentioned in order that the direction of rotation indicated by the arrows in FIGURE 3 may be realized.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. Potato seed cutting apparatus including, in combination, a pair of resilient, elongate feeder rollers disposed in parallel relationship and in proximity with each other and having respective annular grooves in mutual correspondence; means for journaling said feeder rollers affixed thereto; means coupled to said feeder rollers for driving the same in mutual counter-revolvement to carry potatoes fed thereat through said feeder rollers, between the same; and elongate cutter bar means disposed parallel to and adjacent said feeder rollers and between the same and having cutting means disposed within corresponding annular grooves of said rollers for cutting potatoes proceeding through said feeder rollers into sections, said cutter bar means and feeder rollers being so constructed and arranged with respect to each other that said feeder rollers introduce at and feed through said cutter bar means potatoes which are received by said feeder rollers for passage therethrough.

2. Potato seed cutting apparatus including, in combination, a pair of resilient, elongate feeder rollers disposed in parallel relationship and in proximity with each other and having respective annular grooves in mutual correspondence; means for journaling said feeder rollers affixed thereto; means coupled to said feeder rollers for driving the same in mutual counter-revolvement to carry potatoes fed thereat through said feeder rollers, between the same and elongate cutter bar means disposed parallel to and adjacent said feeder rollers and between the same and protruding into corresponding annular grooves of said rollers for cutting potatoes proceeding through said feeder rollers being so constructed and arranged with respect to each other that said feeder rollers introduce at and feed through said cutter bar means potatoes which are received by said feeder rollers for passage therethrough, and wherein said elongate cutter bar includes fixed mounting means parallel to said feeder rollers and plural cutters spaced along and supported by said fixed mounting means, said plural cutters being disposed proximate and between said feeder roller means.

3. Potato seed cutting apparatus including, in combination, a pair of resilient, elongate feeder rollers disposed in parallel relationship and in proximity with each other and having respective annular grooves in mutual correspondence; means for journaling said feeder rollers affixed thereto; means coupled to said feeder rollers for driving the same in mutual counter-revolvement to carry potatoes fed thereat through said feeder rollers, between the same; and elongate cutter bar means disposed parallel to and adjacent said feeder rollers and between the same and protruding into corresponding annular grooves of said rollers for cutting potatoes proceeding through said feeder rollers into sections, said cutter bar means and feeder rollers being so constructed and arranged with respect to each other that said feeder rollers introduce at and feed through said cutter bar means potatoes which are received by said feeder rollers for passage therethrough, and wherein each of said feeder rollers comprises respective shafts and respective first and second pluralities of resilient roller members of respective, different diameters, the plurality of resilient rollers of smaller diameter being interposed between respective ones of those of larger diameter and defining said annular grooves, the larger and smaller diameter rollers of the two feeder rollers being in mutual correspondence, and said cutter bar means being disposed adjacent selected ones of the roller members of smaller diameter and between ones of larger diameter.

4. Structure according to claim 2 wherein said apparatus includes grading alignment means proximately disposed with respect to said feeder roller means, on the side opposite said cutting bar means, for positioning potatoes in registry with said cutters of said cutter bar means.

5. A cutter device including, in combination, plural, principal blade members, a cross blade member disposed between, connected to, and spanning said principal blade members, and plural secondary blade members affixed to and mutually spaced along said cross blade member, said secondary blade members being smaller in its longitudinal dimension than said principal blade members, and wherein said principal blade members converge toward the source of the objects to be passed through said structure.

References Cited by the Examiner

UNITED STATES PATENTS

| | | | |
|---|---|---|---|
| 2,699,806 | 1/55 | Gardner | 146—32 |
| 2,703,595 | 3/55 | Brown | 146—59 X |
| 2,705,986 | 4/55 | Wetzel | 146—59 X |
| 2,752,967 | 7/56 | Sylvain | 146—59 |
| 2,829,653 | 4/58 | Rush | 146—162 X |
| 3,124,186 | 3/64 | Siems | 146—163 |

FOREIGN PATENTS 484,409  7/52  Canada.

ROBERT C. RIORDON, *Primary Examiner.*

LOUIS J. COPAZI, J. SPENCER OVERHOLSER,
*Examiners.*